United States Patent
Murase et al.

(10) Patent No.: US 7,824,767 B2
(45) Date of Patent: Nov. 2, 2010

(54) FLUORESCENT MATERIAL WITH SEMICONDUCTOR NANOPARTICLES DISPERSED IN GLASS MATRIX AT HIGH CONCENTRATION AND METHOD FOR MANUFACTURING SUCH FLUORESCENT MATERIAL

(75) Inventors: Norio Murase, Ikeda (JP); Ping Yang, Ikeda (JP)

(73) Assignee: National Institute of Advanced Industrial Science and Technology, Tokyo (JP)

( * ) Notice: Subject to any disclaimer, the term of this patent is extended or adjusted under 35 U.S.C. 154(b) by 454 days.

(21) Appl. No.: 11/885,886

(22) PCT Filed: Mar. 2, 2006

(86) PCT No.: PCT/JP2006/303974

§ 371 (c)(1),
(2), (4) Date: Sep. 7, 2007

(87) PCT Pub. No.: WO2006/095633

PCT Pub. Date: Sep. 14, 2006

(65) Prior Publication Data

US 2008/0213558 A1    Sep. 4, 2008

(30) Foreign Application Priority Data

Mar. 10, 2005  (JP) ............................. 2005-066487
Jun. 3, 2005   (JP) ............................. 2005-163390

(51) Int. Cl.
*B32B 5/16* (2006.01)
(52) U.S. Cl. ...................... 428/333; 428/323; 428/328; 977/778
(58) Field of Classification Search ................. 428/323, 428/328, 333, 403; 977/778
See application file for complete search history.

(56) References Cited

U.S. PATENT DOCUMENTS

| | | | | | |
|---|---|---|---|---|---|
| 5,812,716 | A | * | 9/1998 | Ohishi | .................... 385/92 |
| 6,803,719 | B1 | * | 10/2004 | Miller et al. | ................ 313/501 |
| 2006/0097624 | A1 | * | 5/2006 | Murase et al. | ............. 313/503 |

FOREIGN PATENT DOCUMENTS

JP    2002-211935    7/2002

(Continued)

OTHER PUBLICATIONS

Ekimov, "Growth and optical properties of semiconductor nanocrystals in a glass matrix", Journal of Luminescence 70, 1-20, 1996.*

(Continued)

*Primary Examiner*—H. (Holly) T Le
(74) *Attorney, Agent, or Firm*—Kratz, Quintos & Hanson, LLP

(57) ABSTRACT

The present invention provides a thin-film fluorescent material in which semiconductor nanoparticles in a stable condition maintain a high fluorescence quantum yield and can be held at a high concentration in a glass matrix. The present invention also provides optical devices using the thin-film fluorescent material, such as high-brightness displays and lighting systems. The present invention relates to a fluorescent material, in which semiconductor nanoparticles with a fluorescence quantum yield of 15% or more and a diameter of 2 to 5 nanometers are dispersed in a glass matrix at a concentration of $5 \times 10^{-4}$ mol/l or more and a method for manufacturing the same.

14 Claims, 6 Drawing Sheets

FOREIGN PATENT DOCUMENTS

WO WO 2004/000971 A1 12/2003
WO WO 2004/065296 A1 8/2004

OTHER PUBLICATIONS

Gao et al; "Strongly Photoluminescent CdTe Nanocrystals by Proper Surface Modification;" J. Phys. Chem. B 1998, 102, pp. 8360-8363.

Lee et al; "Full Color Emission from II-VI Semiconductor Quantum Dot-Polymer Composites;" Adv. Mater. 12, No. 15 (Aug. 2, 2000) pp. 1102-1105.

Zhang et al; "Controlled assembly of fluorescent multilayers from an aqueous solution of CdTe nanocrystals and nonionic carbazole-containing copolymers;" J. Mater. Chem, 13 (2003); pp. 1356-1361.

Halaoui; Layer-by-layer Assembly of Polyacrylate-Capped CdS Nanoparticles in Poly (dialllyldimethylammonium chrolide) on Solid Surfaces; Langmuir 17 (2001), pp. 7130-7136.

Lesser et al; "Highly luminescent thin films from alternating deposition of CdTe nanoparticles and polycations;" Materials Science and Engineering C8-9 (1999) pp. 159-162.

Tang et al; "Semiconductor Nanoparticles on Solid Substrates: Film Structure, Intermolecular Interactions, and Polyelectrolye Effects;" Langmuir 18 (2002) pp. 7035-7040.

Tsuruoka et al; "Synthesis, Surface Modification, and Multilayer Constructions of Mixed-Monolayer-Protected CdS Nanoparticles;" Langmuir 20 (2004) pp. 11169-11174.

* cited by examiner

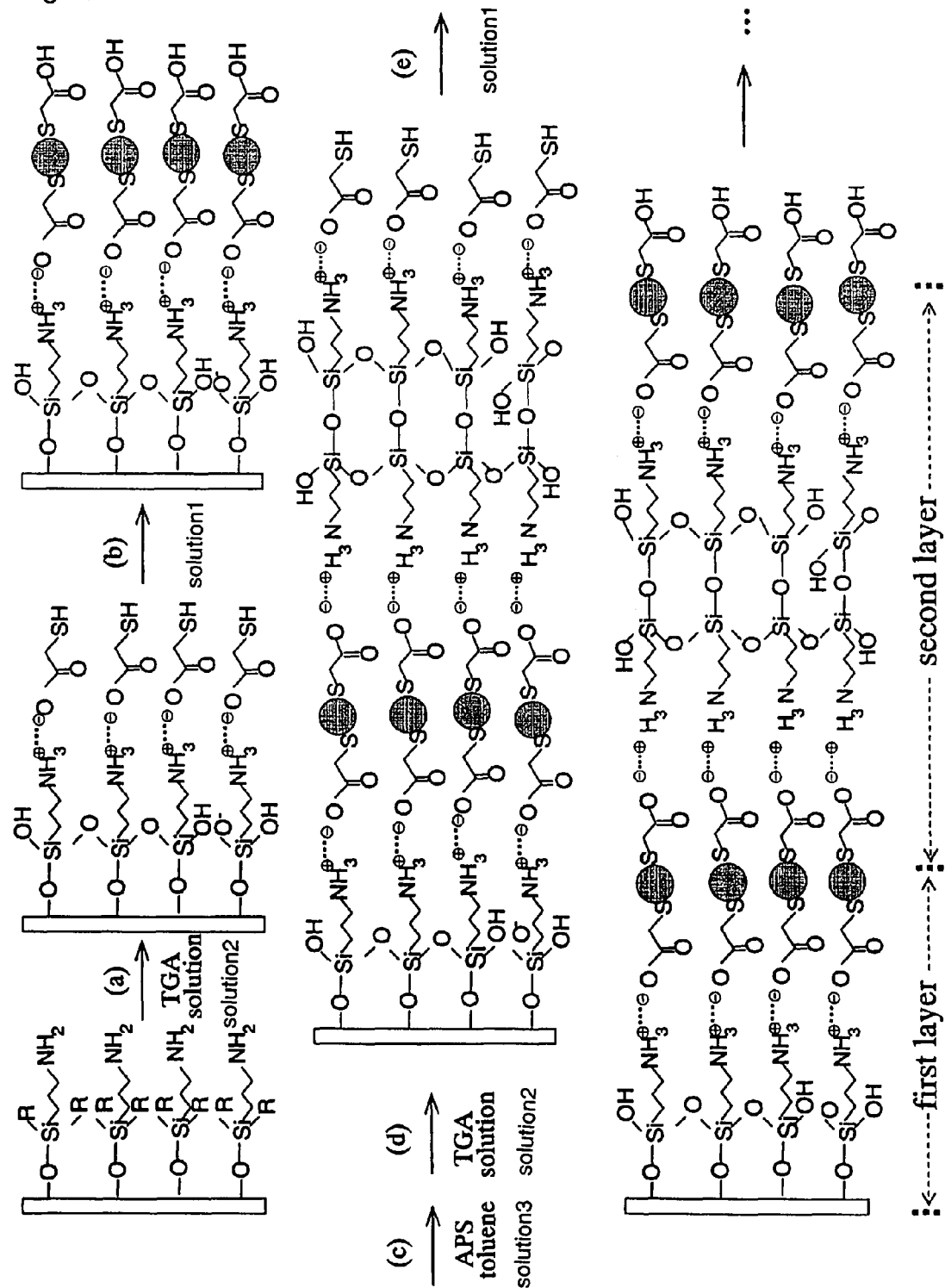
[Fig.1]

[Fig. 2]
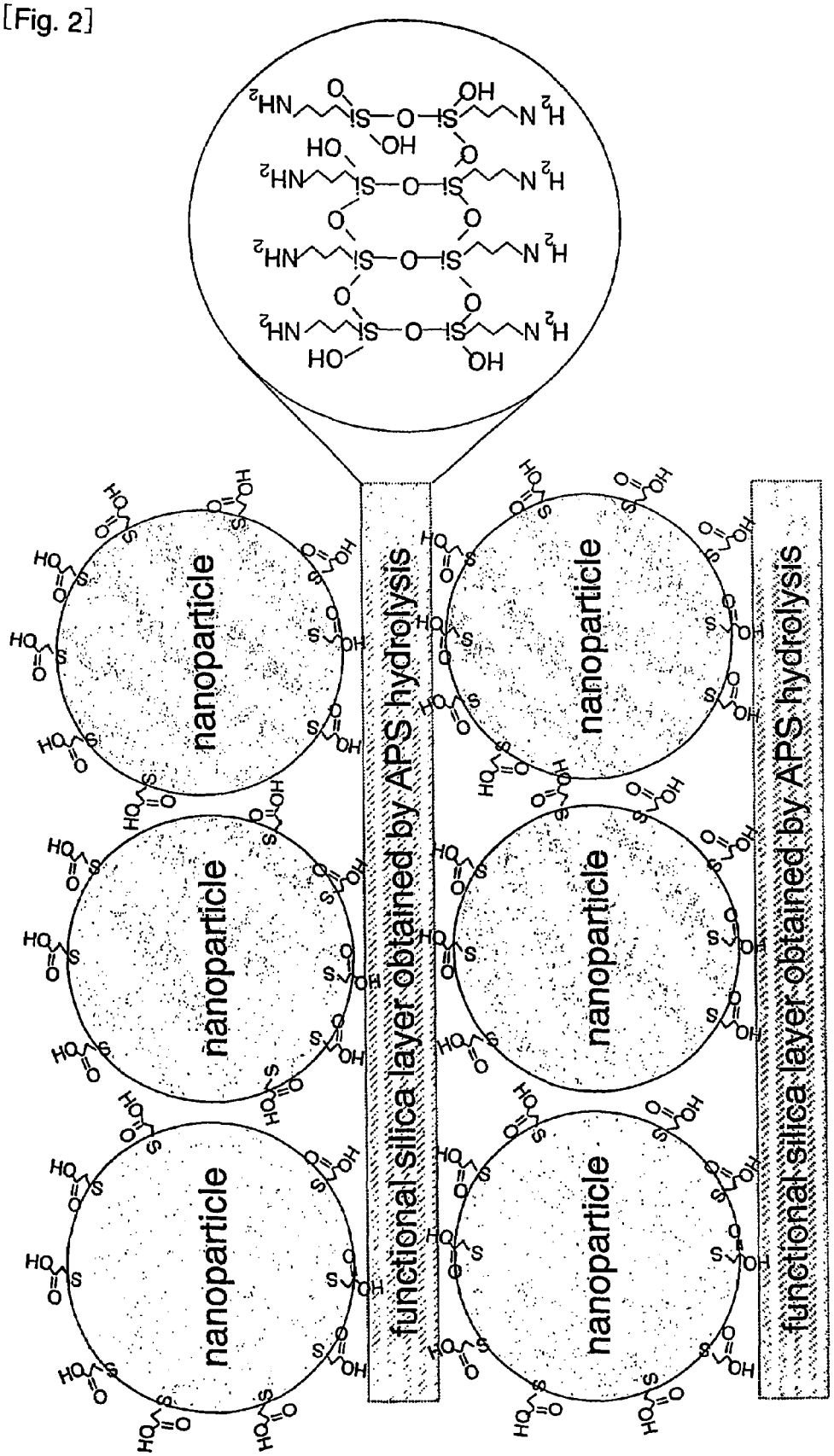

[Fig.3]
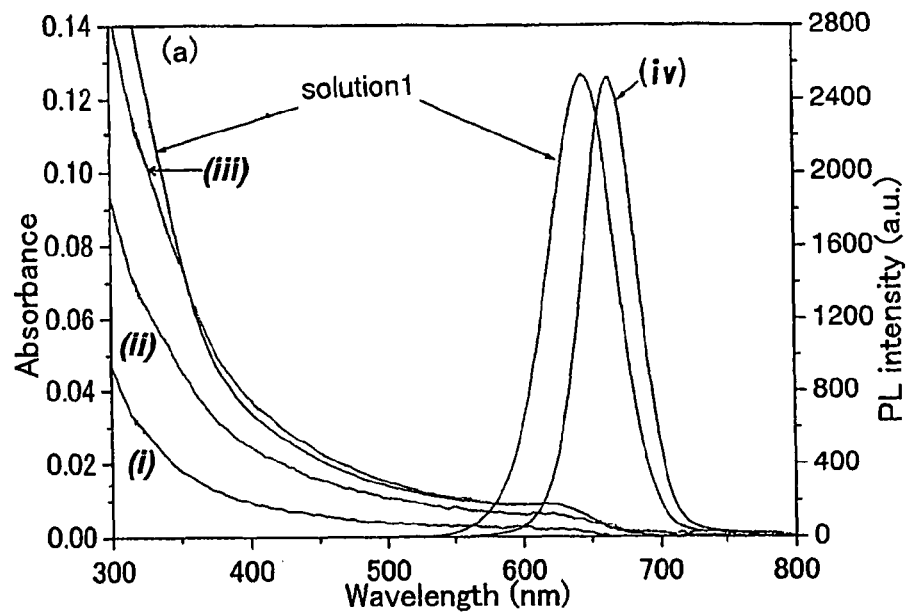
(a)
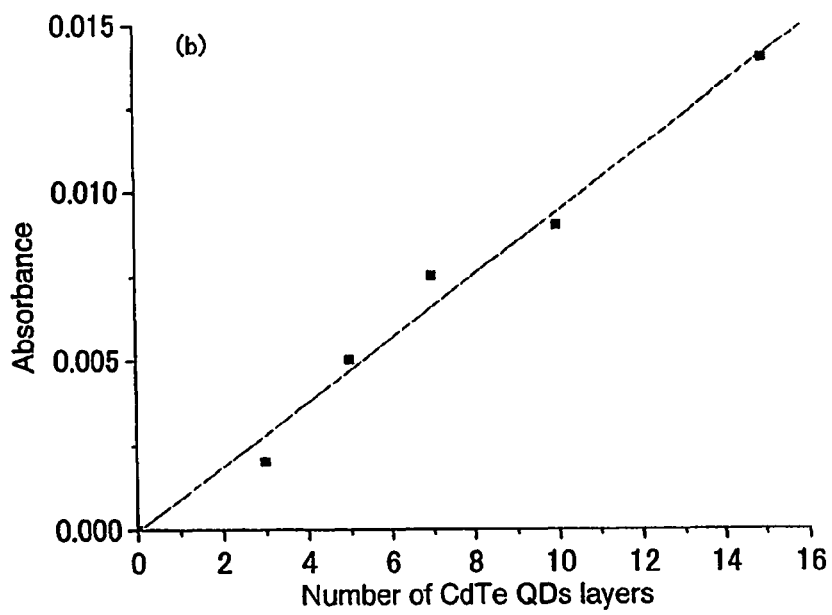
(b)

[Fig.4]
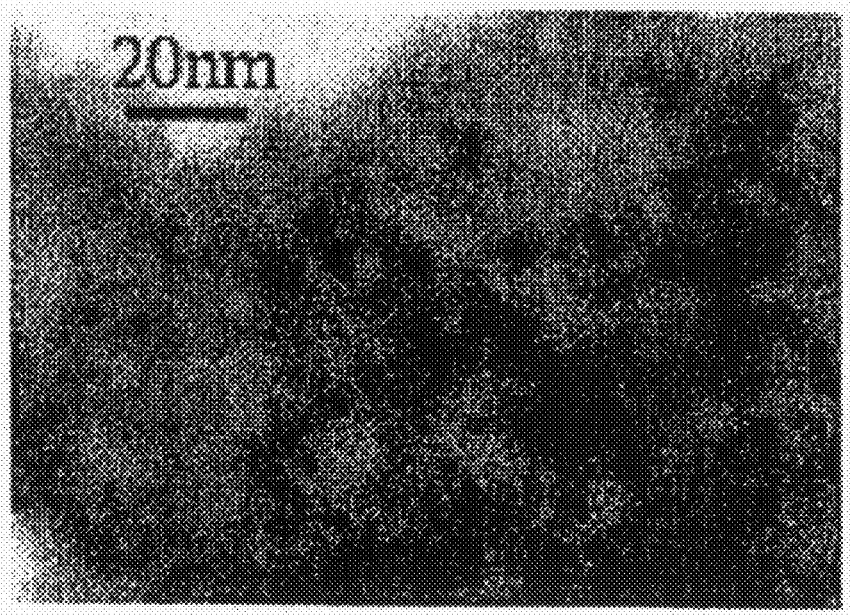

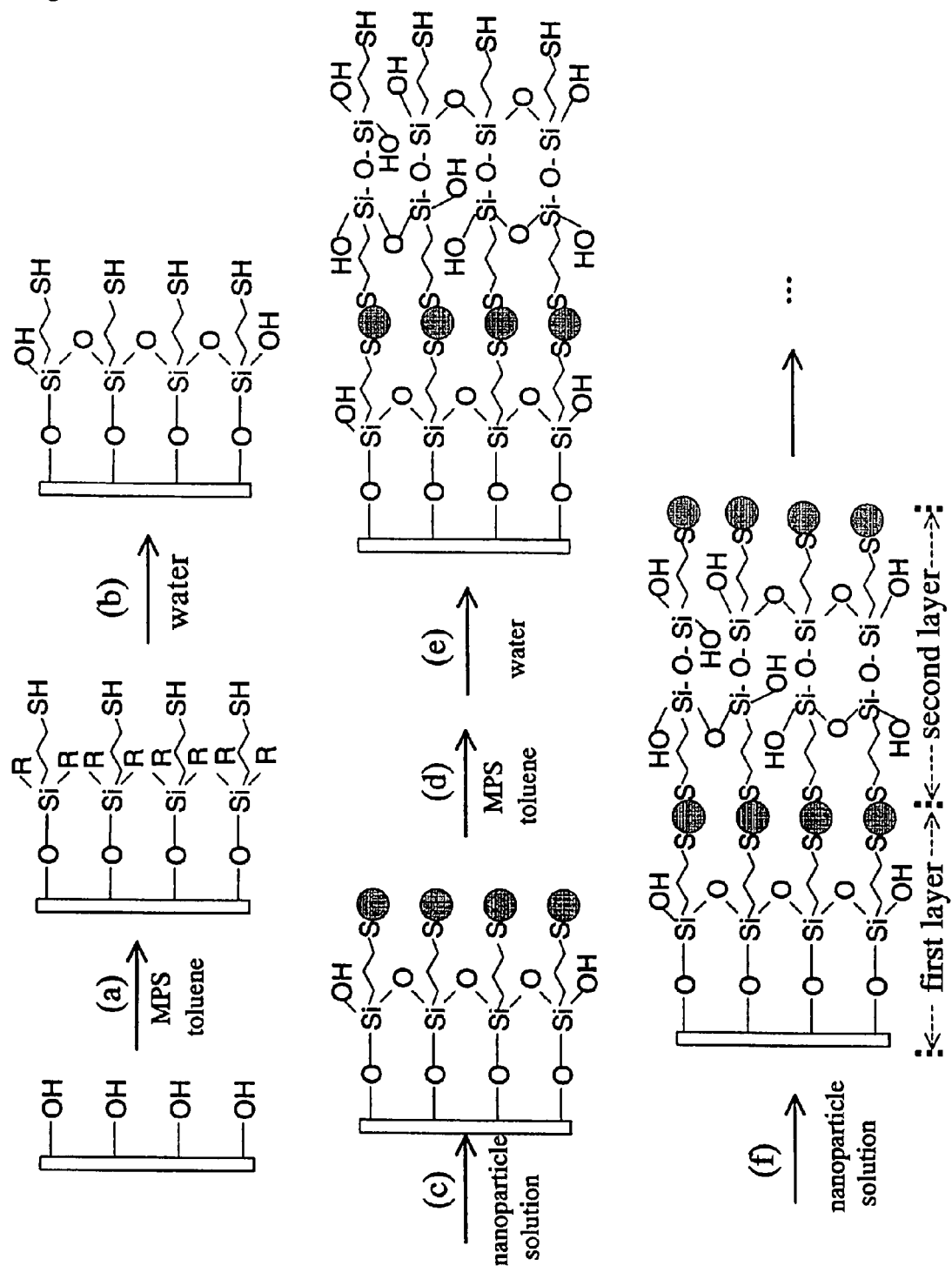
[Fig.5]

[Fig.6]
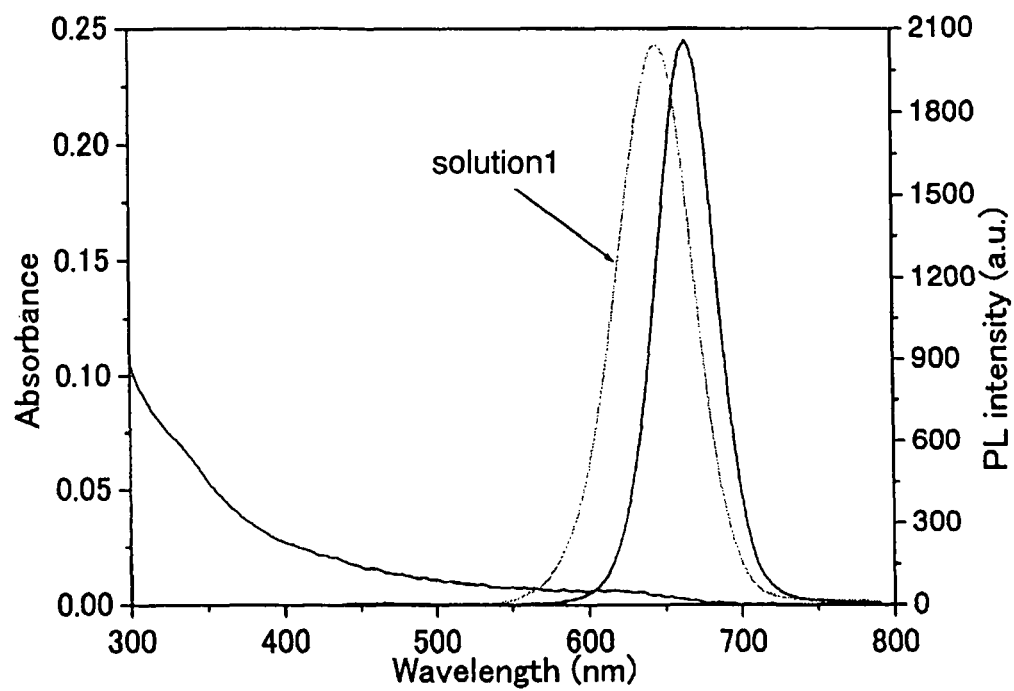

FLUORESCENT MATERIAL WITH SEMICONDUCTOR NANOPARTICLES DISPERSED IN GLASS MATRIX AT HIGH CONCENTRATION AND METHOD FOR MANUFACTURING SUCH FLUORESCENT MATERIAL

TECHNICAL FIELD

The present invention relates to a fluorescent material with semiconductor nanoparticles dispersed therein, a method for manufacturing the same, and light-emitting devices (lighting systems, displays, etc.) using the fluorescent material.

BACKGROUND OF THE INVENTION

Nowadays, fluorescent materials are widely used as illumination or display materials, and support our daily lives. Among such fluorescent materials, inorganic matrices with coloring materials and/or transition element ions (transition-metal ions and/or rare earth ions) have been in use for a long time.

In recent years, it has been discovered that semiconductor nanoparticles obtained by a thoroughly researched manufacturing method emit light efficiently. Among such semiconductor nanoparticles, II-VI group compounds, such as cadmium telluride, and the like, are typically mentioned, and have a diameter of approximately 2 to 5 nanometers. Because semiconductor nanoparticles have a short emission lifetime, and because the emission wavelengths can be controlled by changing particle diameters, such semiconductor nanoparticles are attracting attention as a new luminescent material.

Such semiconductor nanoparticles have a large specific surface area because of their small particle sizes. Thus, in order to suppress radiationless deactivation, and moreover, to raise the fluorescence quantum yield while suppressing aggregation of the particles, a deactivation treatment of reducing the number of surface defects by a surface treatment is usually performed. For such a surface treatment, organic surfactants containing sulfur, such as thiols and the like, and/or zinc sulfide are preferable.

As a method for producing such semiconductor nanoparticles, using a surfactant in an aqueous solution is well known (Non-Patent Document 1). However, the semiconductor nanoparticles produced by the aqueous solution method are unstable while still in the aqueous solution state, and are not suitable for industrial applications.

There is, for example, a report concerning a method for fixing such semiconductor nanoparticles in an organic polymer (Non-Patent Document 2). However, polymers used as a matrix have low levels of light, heat, and chemical resistance, as well as other properties, and gradually permit the passage of water and oxygen. The resulting drawback is a gradual degradation of the fixed nanoparticles.

To overcome the drawbacks of such polymer matrices, there are reports concerning methods for dispersing semiconductor nanoparticles in a glass matrix by a sol-gel process. For example, Patent Document 1 discloses that a sol gel method using organoalkoxysilane can provide a fluorescent material in which semiconductor nanoparticles with a fluorescence quantum yield of 3% or more are dispersed in a solid matrix containing silicon at a concentration of $5 \times 10^{-4}$ to $1 \times 10^{-2}$ mol/l. Patent Document 2 discloses a fluorescent material in which semiconductor nanoparticles with a fluorescence quantum yield of 20% or more are dispersed in a matrix formed by a sol gel method at a concentration of $2 \times 10^{-6}$ to $2 \times 10^{-4}$ mol/l.

These fluorescent materials are obtained by a sol gel reaction by mixing semiconductor nanoparticles, a surfactant, organoalkoxysilane, and the like, and have semiconductor nanoparticles dispersed in a glass matrix. Therefore, the materials can prevent degradation of the semiconductor nanoparticles, and thereby have excellent improved stability over time.

However, a fluorescent material produced by the simple mixing mentioned above does not always reach the required high brightness level. In order to obtain a light-emitting device with a higher brightness, semiconductor nanoparticles with a higher fluorescence quantum yield need to be uniformly dispersed in a matrix at higher concentrations without aggregation. In this regard, there is room for further improvement in the above-described fluorescent materials of Patent Documents 1 and 2.

In recent years, there has been a report concerning a method for forming a thin film comprising semiconductor nanoparticles with high packing density using a layer-by-layer method utilizing chemical adsorption. In the layer-by-layer method, a surface-treated substrate is alternately immersed in at least two kinds of solutions for a given period of time, thereby laminating semiconductor nanoparticles and matrices individually on the surface. In most cases, since coating is performed for every thickness close to that of a monomolecular layer, a thin film with a high packing density of nanoparticles is formed.

As examples of methods for forming thin films comprising semiconductor nanoparticles using this method, Non-Patent Documents 3 to 8 can be mentioned.

Non-Patent Document 3 discloses a fluorescent material in which cadmium telluride nanoparticles (a littler less than 3 nanometers in diameter) are dispersed in matrices comprising a carbazole copolymer and polyacrylamide. The concentration of nanoparticles is 0.05 mol/l. However, the wavelength of fluorescence is sharply shifted to blue and shifted from the visible region, and it is observed that the matrix emits light.

Non-Patent Document 4 discloses a fluorescent material in which cadmium sulfide nanoparticles (3 to 4 nanometers in diameter) are dispersed in a matrix comprising polydiallyldimethylammoniumchloride. The concentration of nanoparticles is 0.003 mol/l, and light emitted from the fluorescent material exhibits an extremely wide spectral bandwidth because the light is emitted from a defect.

Non-Patent Document 5 discloses a fluorescent material in which cadmium telluride nanoparticles (4 nanometers in diameter) are dispersed in a matrix comprising polydiallyldimethylammoniumchloride. The concentration of nanoparticles is 0.01 mol/l. Although the fluorescence quantum yield in a solution state is 20%, the fluorescence quantum yield in a matrix is sharply reduced to as low as 5%.

Non-Patent Document 6 discloses a fluorescent material in which only a single layer of cadmium selenide nanoparticles is adhered to polydiallyldimethylammoniumchloride, and the like, as a base. The fluorescence quantum yield of the nanoparticles before adhesion is as low as 4.2%, and after adhesion, it is estimated to be lower than 4.2%.

Non-Patent Document 7 discloses a fluorescent material in which cadmium sulfide nanoparticles (about 6 nanometers in diameter) are dispersed in a matrix comprising a long-chain alkyl thiol at a concentration of 0.001M. There is no data on light being emitted from the fluorescent material.

However, in the known literature described above, an organic matrix is used, and the wavelength of fluorescence is sharply shifted to blue after nanoparticles are put into the matrix compared to the previous state, and moreover, the fluorescence has a considerable tail towards red due to defects on the surface of the nanoparticles in many cases. In any of the cases above, the fluorescence quantum yield can be estimated to be at most a few percent. In addition, an organic matrix is adopted, which causes problems such as low light, heat, and chemical resistance, moisture permeability, gas permeability and the like. Moreover, the fixed semiconductor nanoparticles deteriorate gradually, causing poor long-term stability.

Such display materials are faced with continuous demands for higher brightness and resolution driven by the current digital boom, and a method for reaching the maximum brightness is desired. Therefore, expectations are high for a thin-film fluorescent material having a high level of brightness in which semiconductor nanoparticles are held at high concentrations in a matrix while maintaining a high fluorescence quantum yield. However, under the present circumstances, a satisfactory thin-film fluorescent material cannot be provided.

Patent Document 1: WO 2004-000971, pamphlet
Patent Document 2: WO 2004-065296, pamphlet
Non-Patent Document 1: Gao, et al., *Journal of Physical Chemistry*, B, vol. 102, p. 8360 (1998)
Non-Patent Document 2: Bawendi, et al., *Advanced Materials*, vol. 12, p. 1103 (2000)
Non-Patent Document 3: Yang, et al., *Journal of Materials Chemistry*, vol. 13, p. 1356 (2003)
Non-Patent Document 4: Halaoui, Langmuir, vol. 17, p. 7130 (2001)
Non-Patent Document 5: Kirsten et al., Materials Science and Engineering C, vol. 8 to 9, p. 159 (1999)
Non-Patent Document 6: Kotov et al., Langmuir, vol. 18, p. 7035 (2002)
Non-Patent Document 7: Akamatsu et al., Langmuir, vol. 20, p. 11169 (2004)

DISCLOSURE OF THE INVENTION

Problems to be Solved by the Invention

A primary object of the present invention is to provide a thin-film fluorescent material in which semiconductor nanoparticles stably maintain a high fluorescence quantum yield and can be held at high concentrations in a glass matrix. Another object of the present invention is to provide optical devices using the thin-film fluorescent material, such as high-brightness displays and lighting systems.

Means for Solving the Problem

The inventors conducted extensive research and found that a thin-film fluorescent material that can maintain a high fluorescence quantum yield and also maintain a high concentration state can be obtained by repeatedly laminating 3-aminopropyltrimethoxysilane (APS) or 3-mercaptopropyltrimethoxysilane (MPS), thioglycolic acid (TGA), and semiconductor nanoparticles on a glass substrate in this order (layer-by-layer method). It is clarified that the thin-film fluorescent material contains semiconductor nanoparticles that are uniformly dispersed in a glass matrix, and has outstanding properties originating from the glass matrix, such as excellent clarity, light resistance, weather resistance, and the like. Further research was conducted based on these findings, and the present invention was accomplished.

More specifically, the present invention provides the following fluorescent materials and methods for producing the same.

Item 1. A fluorescent material in which semiconductor nanoparticles with a fluorescence quantum yield of 15% or more and a diameter of 2 to 5 nanometers are dispersed in a glass matrix at a concentration of $5 \times 10^{-4}$ mol/l or more.

Item 2. A fluorescent material according to item 1, which is a thin film having a film thickness of 10 µm or less.

Item 3. A fluorescent material according to item 1 or 2, wherein a glass matrix and semiconductor nanoparticles are laminated.

Item 4. A fluorescent material according to item 1, 2, or 3, which is formed on a base by a layer-by-layer method.

Item 5. A fluorescent material according to item 4, which is formed on a base by the layer-by-layer method using an aqueous solution of semiconductor nanoparticles comprising organoalkoxysilane and a surfactant.

Item 6. A fluorescent material according to any one of items 1 to 5, wherein the semiconductor nanoparticles belong to Group II-VI compound semiconductors.

Item 7. A fluorescent material according to item 6, wherein the semiconductor nanoparticles are cadmium telluride or zinc selenide.

Item 8. A fluorescent material according to any one of items 1 to 7, wherein the fluorescence quantum yield of semiconductor nanoparticles is 20% or more.

Item 9. A light-emitting device, which is equipped with a thin-film fluorescent material according to any one of items 1 to 8 and an excitation light source.

Item 10. A light-emitting device according to item 9, which is further equipped with a cooling device or heat dissipation material for maintaining a temperature of 50° C. or lower for the thin-film fluorescent material.

Item 11. A method for forming a fluorescent material on a base, the method comprising the following steps of:

(1) treating a base, which has been subjected to a surface treatment with organoalkoxysilane, using an aqueous solution of semiconductor nanoparticles containing a surfactant; and (2) treating the base obtained in step (1), which has been treated with the semiconductor nanoparticles, with organoalkoxysilane.

Item 12. A method for forming a fluorescent material according to item 11, wherein the base obtained in step (2) is subjected to step (1), and
a series of steps (1) and (2) is performed once or repeated two or more times.

Item 13. A method for forming a fluorescent material on a base comprising the following steps of:

(1) treating a base, which has been subjected to a surface treatment with organoalkoxysilane, using an aqueous solution containing a surfactant;

(2) treating the base obtained in step (1), which has been treated with the surfactant, with an aqueous solution of semiconductor nanoparticles containing a surfactant; and (3) treating the base obtained in step (2), which has been treated with the semiconductor nanoparticles, with organoalkoxysilane.

Item 14. A method for forming a fluorescent material according to item 13, wherein the base obtained in step (3) is subjected to step (1), and
a series of steps (1) to (3) is performed once or repeated two or more times.

Item 15. A fluorescent material, in which semiconductor nanoparticles with a diameter of 2 to 5 nanometers, whose fluorescence quantum yield is 15% or more and whose peak wavelength of emission light is in a range of 400 to 500 nanometers, are dispersed in a matrix at a concentration of $5 \times 10^{-4}$ mol/l or more;

the film thickness of the fluorescent material being 10 μm or lower.

In this specification, the term "fluorescence quantum yield of semiconductor nanoparticles in a solution" is defined as a ratio ($\Phi_{PL}/\Phi_A$) of the number of photons ($\Phi_{PL}$) emitted as photoluminescence to the number of photons ($\Phi_A$) absorbed. The fluorescence quantum yield is a value normally used in this technical field, and is synonymous with the term "internal quantum yield". The fluorescence quantum yield is determined by using a dye molecule whose fluorescence quantum yield is known, and comparing the absorbance and the fluorescence intensity of the dye molecule solution and a measurement target at an excitation light wavelength. During the measurement, the absorbance of the dye molecule solution and the measurement target at the same excitation wavelength are made to be identical for comparison by a known method (e.g., Dawson, et al., *Journal of Physical Chemistry*, vol. 72, p. 3251 (1968)).

Also in this specification, the "fluorescence quantum yield of the semiconductor nanoparticles in a fluorescent material" denotes a ratio ($\Phi_{PL}/\Phi_A$) of the number of photons ($\Phi_{PL}$) emitted as photoluminescence from the nanoparticles in the fluorescent material to the number of photons ($\Phi_A$) of excitation light absorbed in the semiconductor nanoparticles in the fluorescent material. Specifically, a glass cell containing a dye molecule-containing solution with known absorbance and fluorescence quantum yield and a glass of a measurement target having the same thickness as the glass cell are prepared, and the absorbance and fluorescence intensity are compared between the dye molecule-containing solution and the measurement target, thereby determining the ratio.

More specifically, in the present invention, an aqueous 0.5M sulfuric-acid solution (54.6% fluorescence quantum yield) of quinine was used as a dye with a known fluorescence quantum yield. Quinine solutions with several concentrations were poured into several cells whose thicknesses are different from each other, and then the fluorescence intensity was measured. Based on the results, the fluorescence quantum yield of glass plates (fluorescent materials) with different thicknesses in which nanoparticles were dispersed at arbitrary concentrations were determined.

More strictly, in determining the fluorescence quantum yield, the above-determined fluorescence quantum yield can be corrected in view of the influence of the refractive index on the fluorescence quantum yield. The corrected fluorescence quantum yield usually becomes larger than the value of a non-corrected fluorescence quantum yield. The prior art documents referred to in the "BACKGROUND OF THE INVENTION" above do not disclose performing such correction. Thus, for easy comparison with prior art techniques, a fluorescence quantum yield not corrected based on refractive index is defined as the fluorescence quantum yield of this application.

Hereinafter, the present invention will be described in detail.

I. Semiconductor Nanoparticles

As semiconductor nanoparticles of the present invention, fluorescent semiconductor nanoparticles with water dispersibility are used. Specifically mentioned are semiconductor nanoparticles belonging to the Group II-VI compound semiconductor that undergo direct transition and emit light in the visible range. Examples thereof include cadmium sulfide, zinc selenide, cadmium selenide, zinc telluride, and cadmium telluride, and of these, cadmium telluride or zinc selenide is preferable. The semiconductor nanoparticles of the present invention are stabilized in an aqueous solution containing a surfactant.

The semiconductor nanoparticles can be produced according to Patent Documents 1 and 2, for example.

More specifically, one or more Group-VI element compounds are introduced into an alkaline aqueous solution under an inert atmosphere in which a water-soluble compound containing a Group-II element and a surfactant are dissolved, thereby obtaining Group II-VI semiconductors. A Group-VI element compound can also be used in the form of a gas.

Preferable as a water-soluble compound containing a Group II element is perchlorate. For example, cadmium perchlorate can be used when the Group II element is cadmium. The concentration of the water-soluble compound containing a Group II element in an aqueous solution is usually within the range of about 0.001 to about 0.05 mol/L, preferably about 0.01 to about 0.02 mol/L, and, most preferably, about 0.013 to about 0.018 mol/L.

Surfactants comprising a thiol group, which is a hydrophobic group, and a hydrophilic group are preferable. Usable as hydrophilic groups are anionic groups, such as a carboxyl group and the like, cationic groups, such as an amino group and the like, hydroxyl groups and the like, and, in particular, anionic groups, such as a carboxyl group and the like are preferable. Specific examples of the surfactant include thioglycolic acid, thioglycerol, mercaptoethylamine, and the like. The amount of the surfactant is about 1 to about 2.5 mol, and is preferably 1 to 1.5 mol, per mol, relative to Group II element ions contained in an aqueous solution. When the amount of surfactant exceeds the above-mentioned ranges, the fluorescence quantum yield of the nanoparticles obtained tends to decrease.

As a Group VI element compound, Group VI element hydrides and the like are usable, and hydrogen telluride can be used when the Group VI element is tellurium. Or, hydrogen telluride is allowed to react with sodium hydroxide to yield sodium hydrogen telluride, which can be introduced in an aqueous solution state for use. The Group VI element compound is used in such a manner that the amount of Group VI ions is generally about 0.3 to about 1.5 mols, and preferably about 0.4 to about 0.9 mols, per mol of Group II ions.

It is preferable to use high-purity water for producing semiconductor nanoparticles. In particular, it is preferable to use ultra-pure water in which the specific resistance is 18MΩ·cm or more and the total amount of organic compound (TOC) in the water is 5 ppb or less, and more preferably 3 ppb or less. A reaction container is sufficiently washed using such high-purity water and the high-purity water is used as a reaction solvent, thereby obtaining semiconductor nanoparticles with excellent luminescent performance.

As usual, the above-described reaction can be carried out by bubbling, under an inert atmosphere, a gaseous Group VI element compound in an aqueous solution in which a water-soluble compound containing a Group II element and a surfactant are dissolved, or by allowing a gaseous Group VI compound to react with a sodium-hydroxide solution to yield an aqueous solution, and injecting it using a syringe or the like into an aqueous solution in which a water-soluble compound containing a Group II element and a surfactant are dissolved.

There is no limitation to the inert gas insofar as the gas does not affect the reaction. Preferable examples of the inert gas include argon gas, nitrogen gas, helium gas, and the like.

The above-described reaction can usually be performed at room temperature (for example, about 10° C. to about 30° C.). The pH of the aqueous solution is preferably about 10 to about 12, and more preferably 10.5 to 11.5. The reaction is usually completed within about 10 minutes after the introduction of the Group VI compound.

Thereafter, by refluxing the reaction mixture in atmosphere, an aqueous solution is obtained in which semiconductor nanoparticles of the desired size are dispersed. The concentration of the nanoparticles in the produced aqueous solution is determined according to the reaction condition, and is usually within the range of $1 \times 10^{-7}$ mol/L to $3 \times 10^{-6}$ mol/L, typically about $3 \times 10^{-7}$ mol/L to about $2 \times 10^{-6}$ mol/L, and preferably $1 \times 10^{-6}$ mol/L.

The particle diameter of the semiconductor nanoparticles obtained by the above-described process is generally about 2 to about 5 nm. The particle size can be enlarged by increasing the reflux time. The particle size determines the color emitted from the semiconductor nanoparticles, and particles with smaller sizes emit shorter wavelengths of light. When the particle diameters of semiconductor nanoparticles are made uniform, monochromatic light can be obtained. When semiconductor nanoparticles of various particle diameters are mixed, various lights with different color tones, depending on the particle sizes, can be obtained.

In order to obtain nanoparticles that emit monochromatic light, the reflux time should be kept constant and the synthesis process should be adjusted so that the standard deviation of the size distribution is 20% or less, and preferably 15% or less of the mean particle size.

The thus-obtained aqueous solution of semiconductor nanoparticles usually contains a Group II element ion used as a starting material, a surfactant, a fine cluster less than 1 nanometer, etc. By using this aqueous solution of semiconductor nanoparticles, the semiconductor nanoparticles as such can be dispersed in a glass matrix to thereby yield a fluorescent material according to the process described later.

The nanoparticles contained in the aqueous solution can be separated according to their particle size. For example, utilizing the fact that larger nanoparticles have lower solubility, the nanoparticles are precipitated according to the same particle size by adding poor solvents, such as isopropanol, in the aqueous solution of the nanoparticles, and the result is centrifuged, for separation.

When the thus refined nanoparticles can be re-dispersed in water to yield an aqueous solution, the refined nanoparticles are imparted with a high fluorescence quantum yield. The aqueous solution as such is stable to some extent. However, the addition of a water-soluble compound containing a Group II element and a surfactant can improve the stability of the aqueous solution, thereby preventing the aggregation of particles, and maintaining a favorable fluorescence quantum yield. The type of Group II element compound, the concentration of the compound, the amount of the surfactant used, the pH of the aqueous solution and the like may be adjusted in the same ranges as those of the aqueous solution used for producing Group II-VI semiconductor nanoparticles described above.

Specifically, an aqueous solution with a pH ranging from about 10 to about 12, preferably about 10.5 to about 11.5, is suitable. More specifically, the aqueous solution comprises Group II-VI semiconductor nanoparticles (about $1 \times 10^{-7}$ to about $3 \times 10^{-6}$ mol/L, preferably about $3 \times 10^{-7}$ to about $2 \times 10^{-6}$ mol/L), a water-soluble compound containing a Group II element as a starting material for the Group II-VI semiconductor nanoparticles (Group II element ion) (about 0.001 to about 0.05 mol/L, preferably about 0.01 to about 0.02 mol/L, and most preferably about 0.013 to about 0.018 mol/L), and a surfactant (about 0.5 to about 5 mols, preferably about 1 to about 1.5 mols, per mol of the Group II element ions contained in the aqueous solution).

In addition, semiconductor nanoparticles of cadmium selenide and the like can be produced in an organic solvent utilizing thermal decomposition of an organic metal. When the surfaces of the semiconductor nanoparticles are replaced with a thiol surfactant, such as thioglycolic acid (TGA) and the like, the result is imparted with water dispersibility, and thus can be used as an aqueous solution of semiconductor nanoparticles.

The semiconductor nanoparticles obtained by the above process are excellent in terms of water dispersibility and fluorescence quantum yield. The fluorescence quantum yield of the semiconductor nanoparticles in this aqueous solution is about 20 to about 70%. In particular, red light-emitting semiconductor nanoparticles can be imparted with a fluorescence quantum yield of about 70% without carrying out post-processing, such as irradiation after preparing the solution. The fluorescence quantum yield of nanoparticles in an aqueous dispersion considerably influences the fluorescence quantum yield of the finished fluorescent material.

The nanoparticles are dispersed in a glass matrix by the layer-by-layer method described later using an aqueous solution of the semiconductor nanoparticles. Thus, the nanoparticles are present in the matrix with favorable dispersibility at high concentrations while maintaining a high fluorescence quantum yield, thereby obtaining a fluorescent material with excellent performance. When using an aqueous solution in which the refined nanoparticles are re-dispersed in water, a fluorescent material with a particularly excellent performance can be obtained.

II. A Method for Manufacturing a Fluorescent Material

The fluorescent material of the present invention is formed on a base by the layer-by-layer method. In the specification, the layer-by-layer method is a method in which a base is alternately treated with an aqueous solution of semiconductor nanoparticles containing a surfactant and two or more liquids (solutions) of organoalkoxysilane and the like, thereby successively laminating semiconductor nanoparticles and matrices on the base surface. According to this method, each component is coated in such a manner as to yield a thickness that is near that of a monomolecular layer or monoparticle layer, whereby a thin-film fluorescent material with a high packing density of semiconductor nanoparticles is formed.

The film thickness of such a fluorescent material can be changed by the number of times the layers are laminated, according to the layer-by-layer method and its repetition cycles. A thin film usually has a film thickness of 10 μm or less, about 0.03 to about 2 μm, or preferably about 0.05 to about 0.5 μm.

Examples of a base for use in a method for manufacturing a fluorescent material of the present invention include glass, plastic, ceramics, and the like, but is not limited thereto. Among the above, glass is preferable. In the present invention a base itself can be used, but it is preferable to use a base with a suitable functional group added to the surface. For example, a base obtained by entirely or partially treating, in advance, the surface of a glass substrate with organoalkoxysilane (e.g., 3-aminopropyltriethoxysilane (APS), 3-mercaptopropyltrimethoxysilane (MPS), etc.) can be mentioned.

The shapes of a base that can be mentioned are, for example, a plate, a tube, a sphere, a rod, a powder, a disc, a convex lens, a concave lens, and the like, and the shape of the base can be selected according to the application.

As a surfactant for use in a method for manufacturing a fluorescent material of the present invention, a surfactant having, in the molecule, a thiol group which is a hydrophobic group and a hydrophilic group is preferable. Examples of a hydrophilic group include a carboxy group, amino group, hydroxyl group, and the like, of which a carboxy group is particularly preferable. Specific examples of a surfactant include thioglycolic acid (TGA), thioglycerol (TG), mercaptoethylamine, and the like, of which thioglycolic acid is particularly preferable.

A surfactant is usually used in an aqueous solution state. The concentration of the surfactant in an aqueous solution is usually about 0.05 to about 1 mol/l, and preferably about 0.1 to about 0.2 mol/l.

As an aqueous solution of semiconductor nanoparticles containing a surfactant for use in a method for manufacturing a fluorescent material of the present invention, the aqueous solution obtained in "I. Semiconductor nanoparticles" above can be used as is. It is especially preferable to use an aqueous solution in which the refined nanoparticles are re-dispersed in water. The concentration of the semiconductor nanoparticles in the aqueous solution is usually $1 \times 10^{-7}$ to $3 \times 10^{-6}$ mol/l, and preferably about $3 \times 10^{-7}$ to about $2 \times 10^{-6}$ mol/l. The concentration of water-soluble compounds containing a Group II element (Group II element ion) in the aqueous solution is about 0.001 to about 0.05 mol/l, and preferably about 0.01 to about 0.02 mol/l. The concentration of a surfactant in the aqueous solution is about 0.005 to about 0.2 mol/l, and preferably about 0.01 to about 0.1 mol/l. The pH of the aqueous solution is usually about 10 to about 12, and preferably about 10.5 to about 11.5.

The organoalkoxysilane for use in a process for manufacturing a fluorescent material is a compound with a skeletal structure containing silicon, and at least one of four bonds of silicon is bonded with a carbon atom, which is represented by Formula (I):

$$SiX_n(OR)_{4-n} \qquad (I),$$

wherein n is 1, 2 or 3, R represents an alkyl group and X represents an amino alkyl group, mercaptoalkyl group, haloalkyl group, or a phenyl group.

Preferably n is 1 or 2, and more preferably, n is 1.

As an alkyl group represented by R, $C_{1-4}$ alkyl groups, such as methyl, ethyl, n-propyl, isopropyl, n-butyl, etc., can be mentioned. Of the above, methyl and ethyl are preferable.

Examples of an amino alkyl group represented by X include a group represented by $NH_2C_mH_{2m}$— (m is an integer of 1 to 6), and, in particular, a group represented by $H_2N(CH_2)_m$— (m is an integer of 2 to 4) with a linear chain is preferable. Preferably, m is 2 to 4, and more preferably, m is 3.

As a mercaptoalkyl group represented by X, a group represented by $HSC_qH_{2q}$— (q is an integer of 1 to 10) is suitable for the example mentioned, and a group represented by $HS(CH_2)_q$— (q is an integer of 2 to 4) with a linear chain is preferable. Preferably, q is 2 to 4, and more preferably, q is 3.

Mentioned as a haloalkyl group represented by X is a group represented by $YC_rH_{2r}$— (r is an integer of 1 to 10 and Y is a halogen atom), and more preferable is a group represented by $Y(CH_2)_r$— (q is an integer of 2 to 4 and Y is a fluorine atom, chlorine atom, or bromine atom) with a linear chain. Preferably, q is 2 to 4, and more preferably, q is 3. Y is preferably chlorine atom.

Among the compounds represented by Formula (I) above, 3-aminopropyltrimethoxysilane (APS), mercaptopropyltrimethoxysilane (MPS), and chloropropyl trimethoxysilane are preferable, and APS and MPS are particularly preferable.

In these organoalkoxysilanes, while a glass network structure (—O—Si—)$_p$; P>1) is formed by a common sol-gel reaction such as hydrolysis of an alkoxy group and condensation polymerization, the functional group represented by X in the above formula is combined with the surfactant attached to the surface of the semiconductor nanoparticles, which stabilizes the semiconductor nanoparticles.

When using an aqueous solution of semiconductor nanoparticles which are stabilized by a surfactant with a thiol group and a carboxyl group, such as thioglycolic acid, it is preferable to use, as the organoalkoxysilane, trialkoxysilane with an amino alkyl group as a functional group. Specifically, a group represented by $H_2N(CH_2)_m$— (m is an integer of 2 to 4) can be mentioned. In this case, since the affinity between the amino group of the organoalkoxysilane and the carboxyl group of the surfactant adsorbed to the surface of the semiconductor nanoparticles is high, the dispersibility of nanoparticles can be increased.

Organoalkoxysilane for the layer-by-layer method is used in the form normally utilized in a sol-gel method, i.e., a form of a solution containing organoalkoxysilane. For example, a solution comprising the above-mentioned organoalkoxysilane(s) and hydrocarbon solvent(s), such as toluene, xylene, or the like, can be mentioned. In this case, the volume ratio of organoalkoxysilane and hydrocarbon solvent may be about 1:0.5 to about 1:5. Or, a solution comprising the organoalkoxysilane, an alcohol compound, such as ethanol, methanol, propanol, butanol, or the like, and water (for example, the volume ratio of organoalkoxysilane, alcohol compound, and water of about 1 mol: 1 to 60 mols: 1 to 20 mols) can be mentioned. As required, a small amount of catalyst, such as hydrochloric acid, acetic acid, nitric acid, ammonia, or the like, is added to thereby prepare a solution. It should be noted that a sol-gel reaction proceeds without a catalyst by the use of an organoalkoxysilane containing an amino group, such as APS or the like. The above-described aqueous solution of the semiconductor nanoparticles is added to this sol solution, and hydrolysis and a condensation polymerization reaction are carried out at about room temperature to about 100° C., thereby forming a glass matrix.

It is also useful to add to the sol solution a water-soluble carbodiimide, such as 1-ethyl-3-(3-dimethylaminopropyl) carbodiimide hydrochloride (WSC), etc. The carbodiimide promotes dehydration condensation of the amino and carboxyl groups. The use of carbodiimide forms a chemical bond between the surfactant adsorbed to the surface of the nanoparticles and the glass matrix, thereby further improving the dispersibility of the particles. The amount of carbodiimide is preferably determined in such a manner as to have about 0.5 to about 8 times, preferably about 2 to about 4 times, relative to the number of mols of the carboxyl group in the surfactant which was added to the aqueous solution in which the refined nanoparticles were re-dispersed in water.

Hereinafter, a method for manufacturing a fluorescent material of the present invention using the layer-by-layer method is described.

Typically, a fluorescent material of the present invention can be formed using a formation method comprising the following steps, as an example. Specifically, FIGS. 1 and 5 schematically show the formation method for reference.

Formation Method 1

Step (1): A base whose surface is treated with organoalkoxysilane is treated with an aqueous solution of semiconductor nanoparticles containing a surfactant. Examples of the base are mentioned above, and a glass base is preferable. Mentioned as the base whose surface has been treated with organoalkoxysilane is a base whose surface is entirely or partially treated with organoalkoxysilane(s) (e.g., APS, MPS, etc.). Thus, the foothold of a laminated structure of a fluorescent material can be formed on the base.

A known method may be used for treating the base surface with organoalkoxysilane. For example, the surface of a glass substrate is washed, followed by treatment with a hydrogen peroxide solution and sulfuric acid to form a hydroxyl group on the surface. The result is immersed in a toluene solution of APS or MPS, washed with pure water, and dried (steps (a) and (b) of FIG. 5). Or, a commercially available base which has been treated in advance with organoalkoxysilane may be used, and, for example, an APS-coated slide glass (No. S8111) manufactured by Matsunami Glass Ind. Ltd. can be mentioned.

When a water-repellent layer is formed on an arbitrary area of the base surface, the portions other than the area on which the water-repellent layer is formed can be coated with organoalkoxysilane. Thus, a fluorescent material of an arbitrary shape can be laminated.

The base is treated by immersion in an aqueous solution of the semiconductor nanoparticles containing the above-mentioned surfactant, for example (step (c) of FIG. 5). The treatment is usually performed by immersing the base at a temperature of 10 to 30° C. for about 1 to 20 minutes. When the immersion time is excessively long, aggregation of semiconductor nanoparticles is likely to occur, which may lead to a reduction of the fluorescence quantum yield. Therefore, it is preferable to adopt the above-mentioned conditions. The treated base is washed with water, thereby obtaining a base whose surface is coated with semiconductor nanoparticles. It can be confirmed as to whether the semiconductor nanoparticles are adhered thereto by measuring the visible-ultraviolet absorption spectrum of the base, or by observing light emitted from the base when the base is irradiated with ultraviolet lights.

Step (2): The base treated with semiconductor nanoparticles obtained in step (1) above is treated with organoalkoxysilane. A known method may be used for treating the base surface with organoalkoxysilane. For example, the base is immersed in the above-mentioned organoalkoxysilane sol solution, for example, a toluene solution of APS, MPS or the like, and then the result is washed with pure water (steps (d) and (e) of FIG. 5). The treatment is usually performed at 10 to 30° C. for about 5 to 15 minutes. The treated base is washed with water, to thereby give a base whose surface is coated with a glass matrix.

In the formation method 1 of the fluorescent material of the invention, because semiconductor nanoparticles may possibly interact directly with a functional group of organoalkoxysilane, it is preferable to use, as organoalkoxysilane, a sulfur atom-containing MPS having high affinity with semiconductor nanoparticles (FIG. 5).

Throughout steps (1) and (2) of formation method 1, a thin-film fluorescent material in which semiconductor nanoparticles and a glass matrix are laminated on the base can be manufactured. For further lamination, it is preferable that a series of steps (1) and (2) be performed once or repeated two or more times. Thus, the stability of the semiconductor nanoparticles in a glass matrix is improved, and the high fluorescence quantum yield thereof is maintained, and also the semiconductor nanoparticles can be held at a high concentration. In general, a series of steps (1) and (2) is performed repeatedly, about two to 500 times, and preferably 10 to 100 times. The thickness of the laminated thin film is variable according to the above-mentioned repetition of cycles (number of times of laminating layers), and is usually about 10 μm or less or about 0.05 to about 0.5 μm.

Formation Method 2

Or, in formation method 1, in order to prevent the coating from separating in a subsequent step after the treatment with organoalkoxysilane, it may be effective to add a step of treatment with a surfactant. In such a case, as a typical example of a method for forming a fluorescent material, the following method is mentioned, for example. Specifically, FIG. 1 schematically illustrates the method.

Step (1): First, a base whose surface has been treated with organoalkoxysilane is treated with an aqueous solution containing a surfactant. The base whose surface is treated with organoalkoxysilane is the same as that of the above-described formation method 1. APS is preferable as an organoalkoxysilane. The base is treated by immersion in an aqueous solution containing the above-mentioned surfactant (step (a) of FIG. 1). The treatment is usually performed by immersing the base in the aqueous solution at 10 to 30° C. for 1 to 20 minutes. The treatment with a surfactant promotes hydrolysis and dehydration condensation of organoalkoxysilane on the base surface, and also strengthens the coating due to interaction with the surfactant. Specifically, as shown in FIG. 1, when the organoalkoxysilane on the base surface is APS and the surfactant is thioglycolic acid (TGA), a strong surface treatment is achieved by electrostatic coupling between an amino group of APS and a carboxy group of TGA or by amide bond formation accompanying dehydration between them.

An aqueous solution containing a surfactant may contain a Group II element ion. The molar concentration of the Group II element ion in the aqueous solution is 0.5 to 30 times, and preferably 1 to 5 times that of the surfactant.

Step (2): Subsequently, the base treated with a surfactant obtained in step (1) above is treated with an aqueous solution of semiconductor nanoparticles containing a surfactant. This step can be performed in the same manner as in step (1) of the formation method 1. Specifically, step (b) of FIG. 1 can be mentioned.

Step (3): The base which has been treated with semiconductor nanoparticles obtained in step (2) above is treated with organoalkoxysilane. This step can be performed in the same manner as in step (2) of formation method 1. Specifically, step (c) of FIG. 1 can be mentioned.

In formation method 2 of the fluorescent material of the invention, because semiconductor nanoparticles may interact via a surfactant with a functional group of organoalkoxysilane, it is preferable to use APS as an organoalkoxysilane, and use TGA as a surfactant (FIG. 1).

Throughout steps (1) to (3) of formation method 2, a thin-film fluorescent material in which semiconductor nanoparticles and a glass matrix are laminated on the base can be manufactured. For further lamination, it is preferable that a series of steps (1) to (3) be performed once or repeated two or more times. Thus, the stability of the semiconductor nanoparticles in a glass matrix is improved, and the high fluorescence quantum yield thereof is maintained, and the semiconductor nanoparticles can also be held at a high concentration. In general, a series of steps (1) to (3) is performed repeatedly about two to 500 times, and preferably 10 to 100 times. The thickness of a laminated thin film is varied according to the above-mentioned repetition of cycles (number of times of laminating layers), and is usually about 10 μm or less or about 0.05 to about 0.5 μm.

In the fluorescent material formed by the above-described layer-by-layer method, semiconductor nanoparticles are present at a high concentration in a glass matrix. The concentration of semiconductor nanoparticles in the fluorescent material is $5 \times 10^{-4}$ mol/l or more, about $6 \times 10^{-4}$ to about $2 \times 10^{-2}$ mol/l, or as high as about $1 \times 10^{-3}$ to about $1 \times 10^{-2}$ mol/l. Among the above, the range of $3 \times 10^{-3}$ to $1 \times 10^{-2}$ mol/l is the most preferable as a range in which no aggregation occurs and the fluorescence quantum yield is not dramatically lowered.

In the process of producing a bulk body as described in Patent Documents 1 and 2, a stirring process is always necessary and aggregation of nanoparticles will occur at concentrations higher than at the given concentration. In the case where the nanoparticles aggregate upon fixation to a matrix, such aggregation has virtually the same effect as when the size of the nanoparticle is enlarged, and the wavelength of emitted light shifts to the red side. Since the levels of such effective particle size enlargement have a wide variety, the emission spectrum width is increased. In addition, the aggregation causes an incomplete chemical bond, resulting in a defect level which enlarges the spectral band width and deteriorates the fluorescence quantum yield.

In contrast, according to the method of the present invention utilizing adsorption, a thin film can be formed gently, while controlling the adsorption time, thereby achieving a state in which semiconductor nanoparticles are dispersed almost uniformly at a high concentration while preventing aggregation. In the case of a thin film produced by the layer-by-layer method of the present invention, the emission light peak shifts slightly to the red side, and the width of the emission spectrum is almost constant or narrowed. This is because, due to the high concentration of nanoparticles, light emitted from particles with small particle diameters is reabsorbed in nearby particles with large particle diameters, and then re-emitted.

Thus, it can be determined whether the particles are uniformly dispersed by the presence of an increase in the width of the emission spectrum, in addition to observation with an electron microscope.

In the fluorescent material of the present invention, since the dispersion concentration of the nanoparticles can be raised to the utmost limit, i.e., about $10^{-2}$ mol/l, the thickness of a thin film can be made relatively thin to thereby improve the adhesion to a base. In practical use, the lower limit of the film thickness is 10 nanometers or more, and preferably 50 nanometers or more. The upper limit of the film thickness is desirably 10 µm or less, and more preferably 2 µm or less in view of adhesion or the transmittance of light. In order to obtain an emitted light with a higher intensity, it is particularly preferable that the film thickness be not less than 40 nanometers inclusive and not more than 1 micrometer inclusive.

The fluorescent material formed by the layer-by-layer method of the present invention has a high fluorescence quantum yield of the semiconductor nanoparticles in the fluorescent material. The fluorescence quantum yield of the semiconductor nanoparticles in the fluorescent material is 15% or more, preferably about 17% to about 50%, and most preferably about 20% to about 40%.

The peak of emitted light in the semiconductor nanoparticles in the fluorescent material of the present invention is in the visible light range, i.e., wavelength range of 400 to 800 nanometers. Since the peak of emitted light for the semiconductor nanoparticles is in the wavelength range of 400 nanometers or more, which is perceivable by the human eye, a high level of brightness can be attained.

In the fluorescent material of the present invention, desirable gradation having various color tones can be obtained by coating and laminating the semiconductor nanoparticles of different emission colors in the manufacturing process.

In the thin-film fluorescent material of the present invention, a thin-film fluorescent material can be formed on all or part of the surface of the base. When a thin-film fluorescent material is formed on a part of the base, the film can be formed into a desired pattern. To be specific, organoalkoxysilane is reacted on the base to yield a predetermined pattern, thereby forming a pattern surface having a functional group (e.g., amino group, —SH group, etc.) on the base. By carrying out lamination using the layer-by-layer method of the present invention, a pattern of a fluorescent material can be formed on the base. A pattern surface having a functional group is formed on the base by, for example, a method comprising printing highly water-repellent ink on a space where no functional group (e.g., amino group) is desired, and then treating organoalkoxysilane having a functional group on the printed base, so that the organoalkoxysilane reacts only with places where wettability remains. If desired, a special pattern may be formed freely, or general repeated patterns are commercially available.

The fluorescent material of the present invention formed by the above-described method fundamentally shows the nature of glass as a whole, and is excellent in various properties, such as mechanical property, heat resistance, chemical stability, and the like. The fluorescent material can be attached with sufficient adhesion particularly to a glass substrate. The semiconductor nanoparticles contained in the fluorescent material are blocked from the external atmosphere, and thus exhibit good stability.

III. Fluorescent Material Applications

Since the fluorescent material obtained by the above process has a high level of brightness and emits various colors of light under irradiation with a single-wavelength light, it can be effectively used in light-emitting devices, such as a lighting device, a display element, and the like, in place of a conventional fluorescent material.

Lighting Devices

In particular, the fluorescent material is combined with semiconductor nanoparticles having suitable particle diameters in accordance with excitation by a mercury lamp with a wavelength of 365 nm or a UV LED, thereby obtaining white illumination light. In addition, the fluorescent material can be used as a lighting device, serving as the backlight of a liquid crystal, such as a cold-cathode fluorescent lamp, a light source for a liquid-crystal projector for presentation purposes using a mercury lamp, and the like.

Display Elements (Display Devices)

A display can be obtained by applying, to a flat plate, the fluorescent material in a detailed pattern. For example, nanoparticles that emit lights in the three colors of RGB are alternately applied separately to a large number of dots having a diameter of about 0.1 mm, and the result is irradiated with ultraviolet light while modulating the intensity in accordance with an information signal, thereby providing a desired display. In such a case, the excitation light source needs to have a light selected from lights with wavelengths where no matrix absorption occurs. Since matrix absorption occurs within a wavelength range of less than 320 nm in many cases, a light source with a wavelength ranging from about 320 nm to about 600 nm, such as a mercury lamp, an LED, a solid-state laser, or the like, is preferable.

In particular, when a strong excitation light is emitted, the temperature of a fluorescent material rises to quicken the deterioration. The activation energy of degradation is about 300 meV(s). Therefore, in order to lengthen the lifetime of the fluorescent material, it is desirable to lower temperatures as much as possible; for example, temperatures of 50° C. or lower are preferable and, if possible, temperatures of 40° C. or lower are more preferable. In order to achieve the above, it is preferable to devise an excitation light source and to have a cooling device, heat dissipation material, and the like. A powerful cooling fan, a water-cooling device, and the like, can be mentioned as a cooling system and metal and ceramics can be mentioned as a heat dissipation material.

Other Applications

The thin-film fluorescent material produced in the present invention is excellent in transparency and is uniform, and therefore can also be used for improving the conversion efficiency of a solar battery, for example. Existing solar batteries mainly comprise amorphous silicon and/or single crystalline silicon. Such a solar battery has no sensitivity to ultraviolet lights, and energy may be lost by absorption of a resin film used for protection. Therefore, by providing such a glass thin film with nanoparticles dispersed therein on the front face that receives sunlight, ultraviolet lights are efficiently converted into visible light, whereby the conversion efficiency can be further improved.

Effect of the Invention

In the fluorescent material of the present invention, semiconductor nanoparticles exist in a stable condition in a glass matrix, and the semiconductor nanoparticles maintain a high fluorescence quantum yield and a high concentration. Therefore, the fluorescent material of the present invention is a thin-film fluorescent material whose level of brightness is higher than that of any other heretofore-known fluorescent materials.

The fluorescent material of the present invention having the above-described outstanding properties can provide optical devices, such as display devices and lighting systems with a high level of brightness in place of conventional fluorescent materials.

BRIEF DESCRIPTION OF THE DRAWINGS

FIG. 1 schematically illustrates the formation process of a thin-film fluorescent material obtained by the layer-by-layer method according to Example 1.

FIG. 2 schematically illustrates the thin-film fluorescent material obtained by the layer-by-layer method according to Example 1.

FIG. 3(a) illustrates an absorption spectrum and a fluorescence spectrum of cadmium telluride nanoparticles in the thin-film fluorescent material of Example 1 and an aqueous solution.

FIG. 3(b) shows the relationship between a lamination cycle and the absorbance of the first absorption peak (near the wavelength of 630 nm).

FIG. 4 is a transmission electron microscope photo of the thin-film fluorescent material obtained in Example 1.

FIG. 5 schematically illustrates a formation process of the thin-film fluorescent material obtained by the layer-by-layer method of Example 8.

FIG. 6 shows an absorption spectrum and a fluorescence spectrum of cadmium telluride nanoparticles in the thin-film fluorescent material of Example 8 and an aqueous colloidal solution.

DETAILED DESCRIPTION OF THE INVENTION

Hereinafter, the present invention will be described in detail with reference to Examples, but is not limited thereto.

EXAMPLE 1

A glass thin film with a dispersion of cadmium telluride nanoparticles emitting red light was manufactured by the layer-by-layer method using aminopropyltrimethoxysilane (APS).

The cadmium telluride nanoparticles were manufactured in accordance with an existing method (Li, Murase, Chemistry Letters, volume 34, page 92, 2005). More specifically, cadmium perchlorate (hexahydrate, 1.095 g) was dissolved in 200 ml of water. To this, thioglycolic acid, (TGA) as a surfactant, was added in an amount of 1.5 times the mols of cadmium perchlorate. To the result, 1 N aqueous solution of sodium hydroxide was added to adjust the pH to 11.4. After degassing for 30 minutes, hydrogen telluride gas was introduced in an inert atmosphere while stirring vigorously. After stirring for 10 minutes, a condenser was attached for refluxing at about 100° C. Cadmium telluride particles grew by refluxing, and the wavelength of emitted light shifted from green to red.

First, refluxing was sufficiently performed to take out cadmium telluride nanoparticles (with a diameter of about 4 nm) emitting red light. The fluorescence quantum yield was 47% based on calculations using, as a standard material, a sulfuric acid solution of quinine according to a standard method in this field. Cadmium telluride was partially or entirely coated with TGA as a surfactant, and was stable in water. This solution is referred to as a "solution 1".

Next, a fluorescent material was manufactured by the layer-by-layer method using, as a base, a slide glass (Matsunami glass Ind., Ltd., No. S8111) coated with APS (see FIG. 1).

First, the slide glass was washed with a sufficient amount of pure water, and then dried. Next, the slide glass was immersed in an aqueous solution of thioglycolic acid (TGA) containing 0.3 M of cadmium perchlorate (0.15 M, pH 10, referred to as a "solution 2") for 5 minutes (Step (a) of FIG. 1). This operation promotes the hydrolysis of APS on the glass surface, and an amino group on the base is weakly bonded to a carboxy group of TGA. Next, the surface of the slide glass was washed with water, and then was immersed in the "solution 1" prepared previously for about 10 minutes (Step (b) of FIG. 1). The slide glass was then taken out, and washed with water. Thereafter, the slide glass was immersed in a toluene solution of APS (APS:toluene=1:2 (volume ratio), referred to as "solution 3") for 10 minutes, to prepare an APS layer (Step (c) of FIG. 1). The slide glass was taken out again, and washed with water, followed by drying. In FIG. 1, R represents a methoxy group (—OCH$_3$).

A cycle of immersion in "solutions 1 to 3" was repeated 10 times. FIGS. 1 and 2 schematically illustrate a film manufactured by this process. Ten nanoparticle layers were obtained by repeating the cycle 10 times.

The fluorescence spectrum of the thin-film fluorescent material was measured, which is shown by (vi) of FIG. 3(a). Based on the absorption wavelength position, the diameter of the nanoparticles was estimated to be 3.9 nm. In FIG. 3(a), (i), (ii), and (iii) represent absorption spectra obtained from coating with 3 laminations, coating with 5 laminations, and coating with 10 laminations, respectively. Measuring was achieved by attaching an included attachment for solid samples (Part No. 650-0161) to a commercially available, frequently used Fluorescence Spectrophotometer (Hitachi F-4500).

The relationship between the cycle (number of times) of laminations and the absorbance of the first absorption peak position (near the wavelength of 630 nm) of the absorption spectrum was plotted, which is shown in FIG. 3(b). Since this is a linear line which passes through zero, it is discovered that the same number of nanoparticles are coated for every cycle. The fluorescence quantum yield of this thin-film fluorescent material was measured to be 24%.

Subsequently, the surface of this sample was slightly scratched to expose glass as a base, and then the thickness was measured to be 48 nm using an atomic force microscope (Nanoscope IIIa, Digital Instruments, Inc.). The concentration of the nanoparticles in the thin film was measured to be $9 \times 10^{-3}$ mol/l from the thickness, the absorbance of the first absorption peak position, and the molar extinction coefficient of the cadmium telluride nanoparticles. The average distance between nanoparticles was calculated to be about 5.7 nanometers from the concentration of the nanoparticles.

The sample was shaved thin and placed onto a thin plate on the observation grid, and observed under a transmission electron microscope, which is shown in FIG. 4. The nanoparticles are viewed as black shadows. The particle diameter was about 4 nm, as expected. It was confirmed that, in view of the average distance of the nanoparticles, the nanoparticles with the concentration mentioned were uniformly dispersed without aggregation.

FIG. 3(a) also shows the absorption spectrum and fluorescence spectrum of "solution 1". Comparison between the fluorescence spectrum of "solution 1" and that of the glass thin film (iv) shows that, when the nanoparticles are fixed in glass matrix, the emitted light is shifted to the red side and the emitted light width is narrowed. This is because, due to a sufficiently high concentration, light emitted from the nanoparticles are reabsorbed in slightly larger nanoparticles nearby, and then the slightly larger nanoparticles re-emit the light.

EXAMPLE 2

The same procedure as in Example 1 was followed except that the slide glass was immersed in an aqueous solution of thioglycolic acid (TGA), i.e., "solution 2" for about 7 minutes, thereby manufacturing a thin-film fluorescent material with a dispersion of nanoparticles having a concentration of the nanoparticles in the thin film of $4 \times 10^{-3}$ mol/l and having a fluorescence quantum yield of 25%.

Thus, it was found that a glass thin film whose concentration is $10^{-3}$ mol/l order and which has a fluorescence quantum yield exceeding 20% was obtained by the layer-by-layer method.

EXAMPLE 3

The same procedure as in Example 1 was followed except that the lamination cycle was repeated 40 times, thereby manufacturing a thin-film fluorescent material with a dispersion of nanoparticles having a concentration of the nanoparticles in the thin film of $9 \times 10^{-3}$ mol/l and having a fluorescence quantum yield of 21%. In this case, it was confirmed that the film thickness of the fluorescent material was about 0.2 μm.

EXAMPLE 4

The same procedure as in Example 1 was followed except for using, as "solution 1", an aqueous solution of nanoparticles obtained by depositing nanoparticles, and then re-dispersing the same according to a known method (e.g., Rogach, et al., Berichte der Bunsen-Gesellschaft, Physical Chemistry, volume 100, page 1,772, (1996)) in place of "solution 1" immediately after manufacturing used in Example 1. In this case, because only the nanoparticles with excellent fluorescence quantum yield were taken out, the fluorescence quantum yield of the nanoparticles in a finished thin film exceeded 30%.

EXAMPLE 5

In place of the commercially available slide glass coated with APS used in Example 1, a commercially available slide glass (Matsunami Glass Ind. Ltd., S1112), which is not coated, was treated with a toluene solution of APS, thereby manufacturing a slide glass coated with APS.

In order to wash the surface of the slide glass and attach a hydroxyl group to the surface, the slide glass was immersed in a solution obtained by mixing 30% hydrogen peroxide solution and 98% sulfuric acid at a volume ratio of 3:1, and was left to stand until gas stopped being emitted. The treated slide glass was washed with a lot of pure water and dried. Then, in the same manner as in Example 1, a thin-film fluorescent material was produced.

According to the method, a thin film with a complicated shape was formed. For example, a 5-ml cylindrical glass bottle was similarly subjected to a surface treatment, whereby a thin film was formed on both the inside and the outside of the glass bottle.

EXAMPLE 6

Although in Example 1, cadmium telluride nanoparticles with red emission light were used, reflux was stopped at an early stage, thereby obtaining cadmium telluride nanoparticles (particle diameter of about 3 nm) with green emission light. The procedure of Example 1 was followed except for the use of the nanoparticles.

In the same manner as in Example 1, the step of immersing a slide glass which was coated with APS beforehand in the "solutions 1 to 3" was repeated 5 times. At this time, the fluorescence quantum yield of the nanoparticles in the thin film was 16%.

EXAMPLE 7

A thin-film fluorescent material was similarly manufactured using zinc selenide with blue emission light. By a known method (Alexey Shavel, et al., Journal of Physical Chemistry, volume 108, page 5905, (2004)), an aqueous solution of zinc selenide nanoparticles containing TGA as a surfactant was manufactured. Then, the fluorescence quantum yield thereof was improved by photo irradiation. A thin-film fluorescent material was manufactured following the procedure of Example 1, except for using the solution in place of "solution 1" of Example 1. The fluorescence quantum yield of the nanoparticles in the obtained thin film was 16%.

EXAMPLE 8

A thin-film fluorescent material was manufactured following the procedure of Example 1, except for using a solution obtained by dispersing, in toluene, MPS in place of APS in Example 1 as "solution 3".

In this case, as shown in FIG. 5, a glass whose surface was washed for attaching an OH group was immersed in "solution 3" for 5 minutes (step (a) of FIG. 5), and then was further immersed in water for 10 minutes (step (b) of FIG. 5). Next, the result was immersed in "solution 1" (cadmium telluride nanoparticle solution of red emission light) of Example 1 for 10 minutes (step (c) of FIG. 5). Next, the result was again immersed in "solution 3" for 5 minutes (step (d) of FIG. 5), then immersed in water, and dried. This layer-by-layer cycle was repeated 10 times.

FIG. 6 shows the absorption spectrum and fluorescence spectrum of a thin-film fluorescent material after 10 cycles. The emission spectrum of "solution 1" is also shown for reference. This shows that, similar to Example 1, the emission spectrum shifted to red, and the emission spectrum was narrowed, probably due to high concentration. The fluorescence quantum yield was 23%.

EXAMPLE 9

According to the layer-by-layer method, a matrix and semiconductor nanoparticles successively adhere to the base surface in a suitable condition. Therefore, a desired pattern can be formed by controlling the condition of the base surface for every location.

The same procedure as in Example 1 was followed, except for using a slide glass (Matsunami Glass Ind. Ltd., S3399F1) with pores of 1-millimeter diameter which were arranged lengthwise and crosswise and whose inner surfaces only are coated with an amino group and whose outer surfaces are printed with a water-repellent fluorine-containing ink. The layer-by-layer method was repeated twice using the slide glass, whereby the thin-film fluorescent material comprising cadmium telluride nanoparticles finely emitting red light was formed only in the pores.

The invention claimed is:

1. A fluorescent material in which semiconductor nanoparticles with a fluorescence quantum yield of 15% or more and a diameter of 2 to 5 nanometers are dispersed in a glass matrix at a concentration of $5 \times 10^{-4}$ mol/l or more,
   wherein said glass matrix and said semiconductor nanoparticles are laminated.

2. A fluorescent material according to claim 1, which is a thin film having a film thickness of 10 μm or less.

3. A fluorescent material according to claim 1, which is formed on a base by a layer-by-layer method.

4. A fluorescent material according to claim 3, which is formed on a base by the layer-by-layer method using organoalkoxysilane and an aqueous solution of semiconductor nanoparticles comprising a surfactant.

5. A fluorescent material according to claim 1, wherein the semiconductor nanoparticles belong to Group II-VI compound semiconductors.

6. A fluorescent material according to claim 5, wherein the semiconductor nanoparticles are cadmium telluride or zinc selenide.

7. A fluorescent material according to claim 1, wherein the fluorescence quantum yield of semiconductor nanoparticles is 20% or more.

8. A light-emitting device, which is equipped with a thin-film fluorescent material according to claim 1 and an excitation light source.

9. A light-emitting device according to claim 8, which is further equipped with a cooling device or heat dissipation material for maintaining a temperature of 50° C. or lower for the thin-film fluorescent material.

10. A method for forming the fluorescent material according to claim 1 on a base, the method comprising the following steps of:
    (1) treating a base, which has been subjected to a surface treatment with organoalkoxysilane, using an aqueous solution of semiconductor nanoparticles containing a surfactant; and
    (2) treating, with organoalkoxysilane, the base obtained in step (1), which has been treated with the semiconductor nanoparticles.

11. The method for forming the fluorescent material according to claim 10, wherein
    the base obtained in step (2) is subjected to step (1), and
    a series of steps (1) and (2) is performed once or repeated two or more times.

12. A method for forming the fluorescent material according to claim 1 on a base comprising the following steps:
    (1) treating a base, which has been subjected to a surface treatment with organoalkoxysilane, using an aqueous solution containing a surfactant;
    (2) treating, with an aqueous solution of semiconductor nanoparticles containing a surfactant, the base obtained in step (1), which has been treated with the surfactant; and
    (3) treating, with organoalkoxysilane, the base obtained in step (2) which has been treated with the semiconductor nanoparticles.

13. The method for forming the fluorescent material according to claim 12, wherein
    the base obtained in step (3) is subjected to step (1), and
    a series of steps (1) to (3) is performed once or repeated two or more times.

14. A fluorescent material, in which semiconductor nanoparticles with a diameter of 2 to 5 nanometers, whose fluorescence quantum yield is 15% or more and whose peak wavelength of emission light is in a range of 400 to 500 nanometers, are dispersed in a glass matrix at a concentration of $5 \times 10^{-4}$ mol/l or more;
    the film thickness of the fluorescent material being 10 μm or lower; and
    said glass matrix and said semiconductor nanoparticles being laminated.

* * * * *